United States Patent
Del Fabbro

(10) Patent No.: US 6,252,329 B1
(45) Date of Patent: Jun. 26, 2001

(54) ROTOR STACK

(75) Inventor: Enrico Del Fabbro, Pordenone (IT)

(73) Assignee: Zanussi Elettromeccanica S.P.A., Pordenone (IT)

( * ) Notice: Subject to any disclaimer, the term of this patent is extended or adjusted under 35 U.S.C. 154(b) by 0 days.

(21) Appl. No.: 09/403,564

(22) PCT Filed: Oct. 12, 1998

(86) PCT No.: PCT/EP98/06469

§ 371 Date: Oct. 25, 1999

§ 102(e) Date: Oct. 25, 1999

(87) PCT Pub. No.: WO99/23739

PCT Pub. Date: May 14, 1999

(30) Foreign Application Priority Data

Oct. 31, 1997 (IT) .............................................. PN97U0043

(51) Int. Cl.[7] .................................................. H02K 1/06
(52) U.S. Cl. ............................. 310/217; 310/261; 29/609
(58) Field of Search .................................... 310/216, 217, 310/261; 29/598, 609

(56) References Cited

U.S. PATENT DOCUMENTS

| | | | |
|---|---|---|---|
| 3,590,208 | * | 6/1971 | Martini et al. ........................ 219/92 |
| 4,110,895 | * | 9/1978 | Mitsui ................................ 29/564.2 |
| 4,619,028 | * | 10/1986 | Neuenschwander .................. 29/33 L |
| 4,979,285 | * | 12/1990 | Martin ..................................... 29/598 |
| 5,142,178 | * | 8/1992 | Kloster et al. ........................ 310/217 |
| 5,163,217 | * | 11/1992 | Sakanishi ............................ 29/564.6 |
| 5,338,996 | * | 8/1994 | Yamamoto ............................ 310/217 |
| 5,649,349 | * | 7/1997 | Greenway ............................. 29/598 |
| 5,767,607 | * | 6/1998 | Kieffer ................................. 310/261 |
| 5,894,182 | * | 4/1999 | Saban et al. ........................ 310/217 |

FOREIGN PATENT DOCUMENTS

0160147A2 * 11/1985 (EP) .

* cited by examiner

*Primary Examiner*—Joseph Waks
(74) *Attorney, Agent, or Firm*—Pearne & Gordon LLP

(57) ABSTRACT

Rotor for electric motors, in which the laminations of two types and arranged alternately, are made in a manner that a first type is provided with a plurality of protrusions formed by respective protruding tabs, a plurality of perforations being punched in the lamination near the edge of a respective tab with the same orientation pattern thereof so as to create an alternate sequence of tabs and respective perforations, wherein a respective cavity is provided in the respective lamination in correspondence of the tabs of said first type, whereas the second type of laminations is provided with a plurality of different tabs adapted to engage the cavities formed by the association of said recesses corresponding to said first tabs with said respective perforations, wherein the tabs of the second type are produced without any removal of material.

6 Claims, 4 Drawing Sheets

ROTOR STACK

DESCRIPTION

The present invention refers to a new kind of mutual connection of the laminations of a rotor stack to be used in electric motors.

The manufacturing technology for these rotors, and in particular for such mutual connections of the laminations thereof, is generally known in the art and is used in a most identical manner by the various manufacturers, except for a few obvious differences that are prevailingly due to manufacturing optimization steps taken by the individual manufacturers or design constraints.

Said rotor stacks are essentially manufactured under utilization of such an expedient for locking the laminations in relation with each other as this is shortly described below in view of facilitating a comparison with the method according to the present invention which is described further on. In the production of so-called squirrel-cage rotors for motors to be in particular, but not solely used in such applications as refrigeration compressors, the rotor stack is required to be manufactured under compliance, as far as possible, with following requirements:

- in the first place, the laminations should maintain a maximum extent of integrity when undergoing processing for connection or "buttoning" to each other, since any processing that is likely to remove iron content from them is going to impair the ferromagnetic properties thereof;
- the perimetrical slots that are provided within the rotor stack receive the die-cast material that definitively links and locks together said rotor stack as shown in the cross-sectional view appearing in FIG. 8;
- said slots shall furthermore be slightly inclined (skew) with respect to the rotor axis in view of enabling these slots to more softly move past the slots of the stator, thereby opposing an effect that is generally well-known to those skilled in the art, so that it does not need to be illustrated any further.

To the purpose of accelerating and rationalizing the formation of the rotor stack, the latter is usually assembled directly in the punching die, where also the elements used to bring about said mutual fastening or buttoning of the laminations are formed.

The term "buttoning" is used here in a rather symbolic way, since said laminations are processed in such a manner as to be provided with protrusions and recesses or cavities so that said protrusions of a lamination are then able to be press-fitted into the corresponding cavities of a contiguous lamination, in such a manner that eventually all said laminations are fastened up to each other almost as if they were actually "buttoned" together.

With reference to FIGS. 1, 2a, 2b, 2c and 2d it can be noticed that said mutual buttoning of the laminations is obtained, according to the state-of-art technlogy, by processing the laminations in the following manner:

- the laminations are made according to two distinct topologies, ie. a first topology as illustrated in FIG. 2b and a second topology as shown in FIGS. 2a and 2c;
- a plurality of punchings 2 are provided in the lamination according to the illustration in FIG. 2b, and are arranged in the same lamination according to the pattern shown therein, so that the related punched portions or tabs 25 are caused to protrude from the respective laminations, whereas respective cavities are provided in correspondence with said tabs.

Furthermore, a small zone of said laminations is further processed by punching a perforation 4 on the side of said tabs 25, as this is shown in the enlarged view appearing in FIG. 1 referring to said first lamination topology and illustrating, further to said perforation, also a respective adjacent protruding tab 25.

The laminations according to the second topology, which are illustrated in FIGS. 2a and 2c, are made in a much identical manner, except for the fact that punchings are provided in the laminations to likewise form respective tabs 5, which however have a length that is shorter than the overall length L of the tab and the therewith associated perforation of the laminations of the above described first type (see FIG. 1); moreover, these punchings are not associated with any perforation Such laminations are then associated with each other alternately, as this is best shown in the central portion G of FIG. 2d, so that the tabs of the laminations of the second type are able to press-fit into the corresponding cavities that are provided, along with the above mentioned perforations, in the laminations of the first type, so as to thereby ensure a firm mutual fastening of adjacent laminations.

The afore mentioned "skew effect" is brought about by the fact that, owing to the tabs of the laminations of the first type being shorter than their respective receiving recesses in the contiguous laminations including the therewith associated perforation, it is possible for a lamination to be rotated by a small, but anyway sufficient extent with respect to the adjacent lamination so as to obtain the desired rotational misalignment, or skew, of the laminations with respect to each other.

The foregoing is well-known and clearly shown in U.S. Pat. No. 3,590,208, European Patent No. EP 0,160,147, and U.S. Pat. No. 5,163,217.

However, such a solution has a twofold drawback in that ferromagnetic material, ie. the one relating to said perforations made in the laminations of the first type, is anyway removed, while the possibility furthermore arises for overlapping perforations in contiguous laminations to practically form continuous channels into which die-cast alloy may then be poured so as to form further alloy bars 20, as this is symbolically shown in FIG. 7, that unavoidably affect the electrical behaviour of the same rotor, as anyone skilled in the art is well aware of.

It thereforewould be desirable, and actually is a purpose of the present invention, to provide a rotor stack that enables both such a perforation of the laminations and the resulting removal of ferromagnetic material to be avoided, and such additional bars of die-cast alloy to be prevented from forming during the die-casting process.

According to the invention, this aim is reached in a type of rotor provided with laminations having features and characteristics as recited in the appended claims and described below by way of non-limiting example with reference to the accompanying drawings, in which:

FIG. 4 is a front view of the same lamination as shown in FIG. 3a;

The basic idea behind the invention is described below.

Figure 2B:
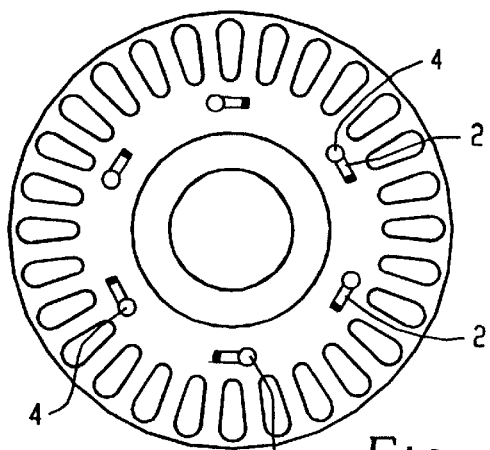
FIG. 2b is a front view of a first type of lamination according to the prior art.
Figure 2D:
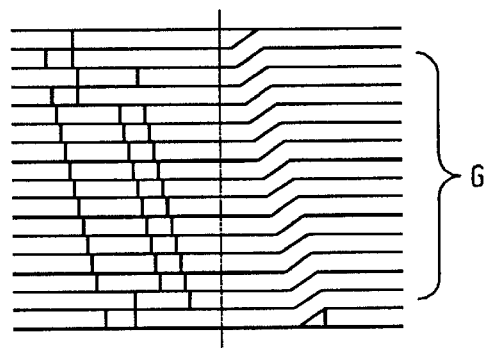
FIG. 2d is an enlarged vertical-section view of a rotor stack whose central laminations are shown in FIGS. 2a and 2b.
Figure 2C:
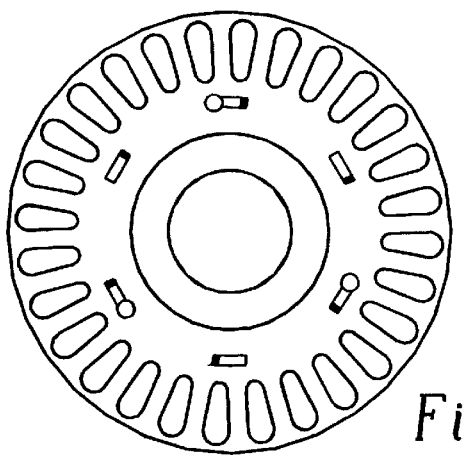
Figure 3A:
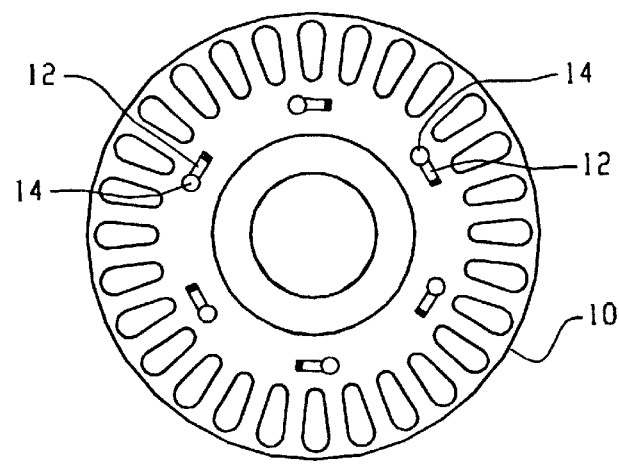
FIGS. 3a and 3b are respective front views of two different types of laminations according to the invention.
Figure 3B:
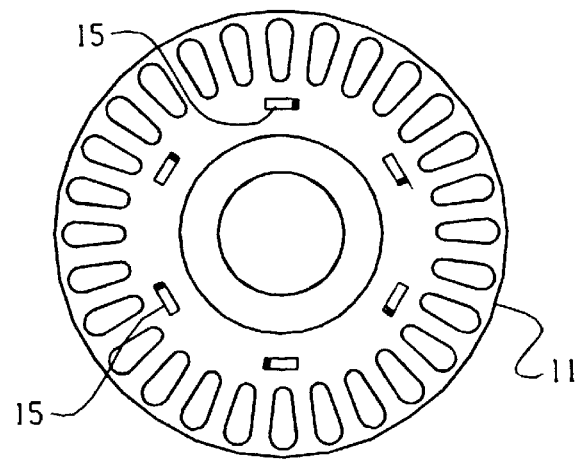
Figure 3C:
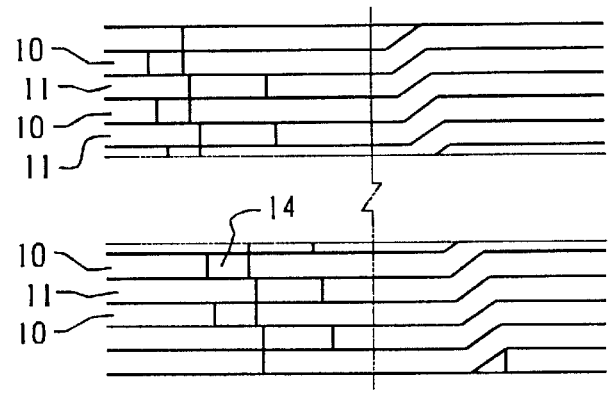
FIG. 3c is an enlarged vertical-section view of the rotor stack made with the laminations illustrated in FIGS. 3a and 3b.

With reference to FIGS. 3a and 3b it can be noticed that the laminations according to the invention divide into two distinct types indicated at 10 and 11, respectively. The lamination of the first type 10 is substantially similar to the lamination illustrated in FIG. 2b, since it is provided with a plurality of cavities and respective tabs 12, and since all said cavities are provided with a respective perforation 14 on an edge thereof.

Figure 4:
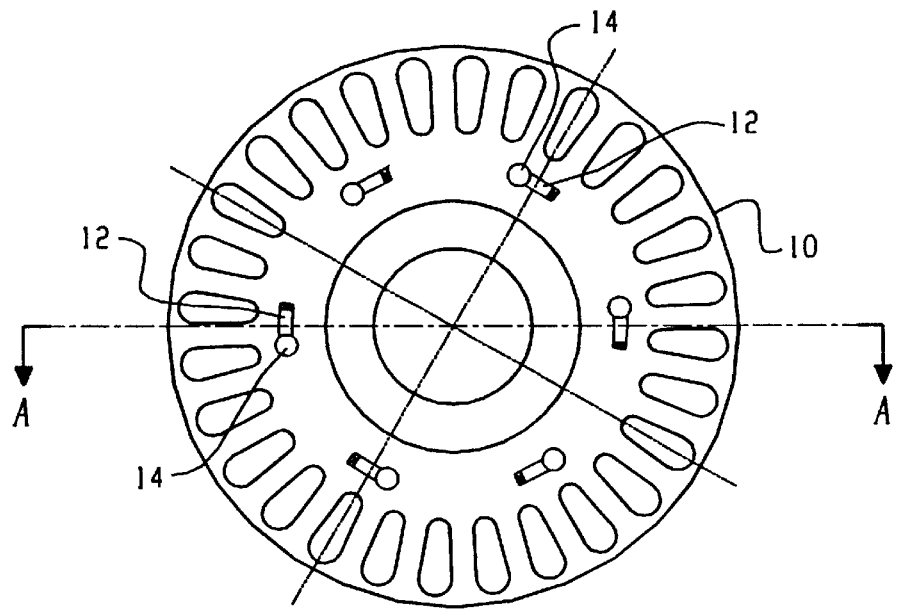
Figure 5:
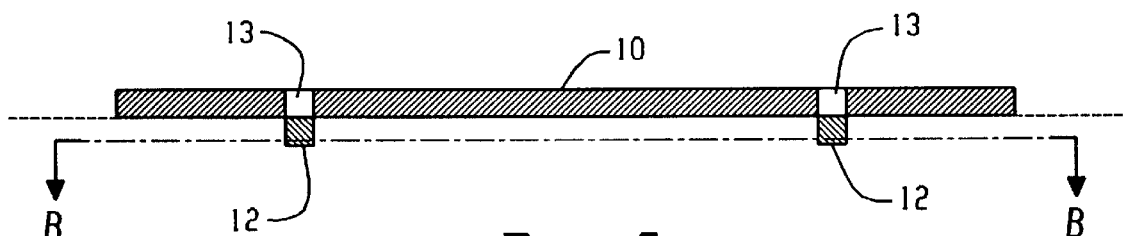
FIG. 5 is a vertical-section view of the lamination of FIG. 4, as taken along the line A—A.
Figure 6:
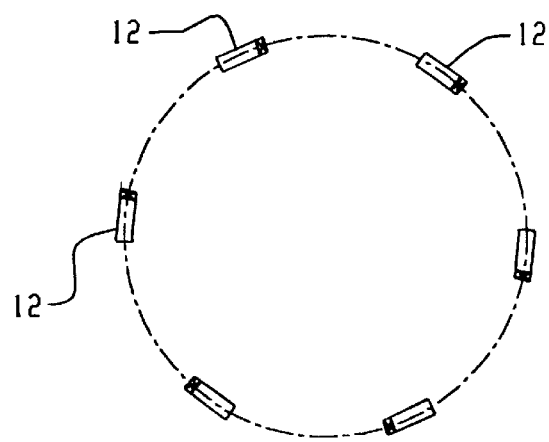
FIG. 6 is a view of a front section of the the lamination of FIG. 4, as taken along the line B—B in FIG. 5.
Figure 7:
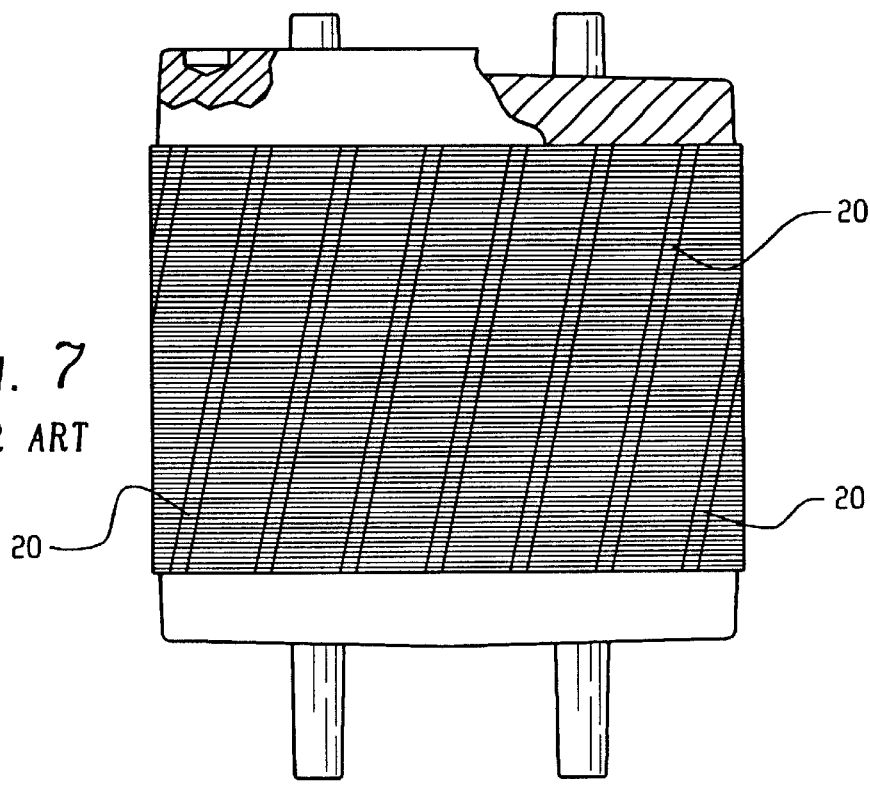
FIG. 7 is a symbolical partially see-through view of a rotor stack according to the prior art.
Figure 8:
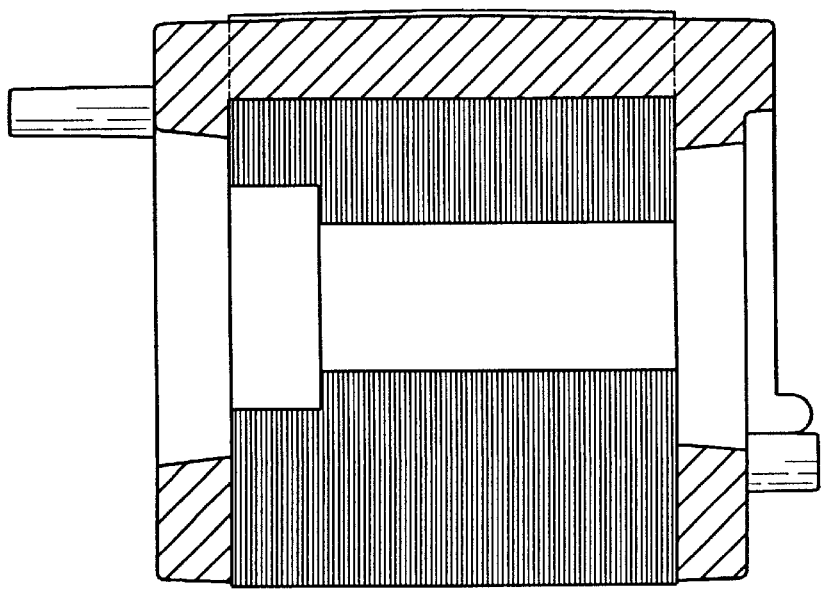
FIG. 8 is a schematical cross-sectional view of a rotor stack according to the prior art.

The illustrations in FIGS. 4, 5 and 6 are very clear in this connection: they unmistakeably show how the tabs 12 and for the matter only such tabs, are arranged so as to protrude from the lamination 10, thereby bringing about a respective cavity 13.

Their arrangement along a circurnference, their orientation and their spacing are clearly shown in the drawings, so that they shall not be explained any further.

The lamination of the second type 11 is provided with an equal plurality of cavities and respective tabs 15. However, following differences exist between said first type and said second type of lamination:

a) no perforations made on the edges of the cavities actually exist in the lamination 11 of the second type; as a result, each cavity in the same lamination is obtained by simply punching the same lamination, while the related portion is caused to protrude so as to form a tab 15 extending over an external zone in such a manner as to become an orthogonal projection of the respective cavity, similarly to what has been previously set forth in connection with the lamination of the first type;

b) the length of these tabs 15 of the second lamination is such as to make it possible for them to fit completely into the cavities 13 of the first lamination, in such a manner that these cavities, including the respective perforations, are entirely occupied, ie. filled by said tabs 15.

Furthermore, the lengths of both tabs and cavities in relation with each other will be selected in such a manner as to enable the slight rotational slip about the rotor axis to be brought about as necessary for the afore mentioned spiral-like assembly of the laminations, or "skew", to be obtained.

It will also be appreciated that the dimensions and the shape of the above described component parts are such as to enable the tabs 12 of the first lamination to fully engage the cavities of the second lamination, since said tabs are shorter than said cavities provided in the second lamination.

At this point, the rotor stack is made by alternately assembling the laminations of the first and the second types shown in FIGS. 3a and 3b, respectively, in such a manner that each tabs is press-fitted into a respective cavity in the adjacent lamination, which thing is on the other hand fully and conveniently enabled by the particular construction and dimensions selected.

It can conclusively be stated that, in the above described manner, a rotor stack is therefore obtained in which all laminations thereof are correctly "buttoned" to each other.

Figure 1:
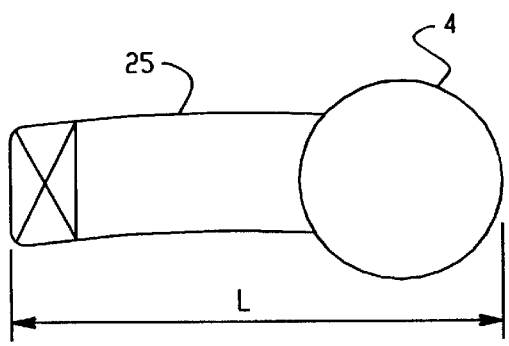
FIG. 1 is an enlarged view of a detail of the lamination according to the prior art and shown in its entirety in FIG. 2b.
Figure 2A:
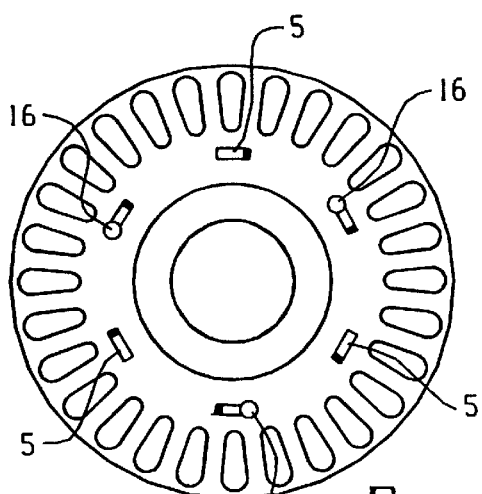
FIGS. 2a and 2c are front views of a second type of laminations according to the prior art.

If FIGS. 2a and 3b are compared, which illustrate the same type of lamination according to the prior art and the present invention, respectively, it can be clearly noticed that the perforations 16 existing in the lamination illustrated in FIG. 2a are eliminated in the lamination according to the present invention, thereby doing away with the related removal of ferromagnetic material therefrom and bringing therefore about a corresponding desired improvement in the properties and characteristics of the rotor stack.

As far as the previously mentioned effect of a formation of additional bars, this is avoided owing to the cavities of the tabs of the laminations of the first type (FIG. 3a) being entirely filled up by the tabs of the laminations of the second type (FIG. 3b).

As a matter of fact, the possibility arises with the above described construction for only laminations of the above described types to be used throughout the whole stack in order to obtain the desired results, without any need for the construction technique or the type of laminations to be modified in correspondence of the two rotor heads. This results in a number of clear advantages in terms of both a simplification of the manufacturing process, since a lower number of lamination types are required as compared with the prior art, and an increase in the rapidity with which the rotor stacks can actually be assembled.

A further advantage deriving from the present invention is offered by the following circumstance: it is a generally well-known fact that, under current production conditions, dissymetries arise in the geometry of the thickness pattern of the lamination, which thing eventually leads to rotor stacks that are markedly unbalanced and uneven in their height when measured along different directrices.

A common practice, in view of reducing or eliminating such dissyrnetries, consists in performing a so-called "compensation" operation, ie. an operation calling for some laminations to be rotated according to a programmed pattern about the axis of the rotor by an angle which is generally greater than 45°; in this way, the above cited dissymmetries are distributed in an even manner and, conclusively, the rotor stack turn out to be much more uniform from both a mechanical and an electrical point of view.

Most obviously, the angle of rotation for this compensation procedure shall be exactly the one enabling cavities and tabs of the laminations to keep overlapping correctly. For this reason, such an angle will obviously be twice as much the angle of 360°/n, where n is the number of cavities in the laminations in which also the perforations are provided; for instance, in the lamination illustrated in FIG. 2b such a number is equal to 6 (n=6), so that the minimum angle of rotation required for compensation is 2×360°/6=120°. If FIGS. 3a and 3b are now observed, it can most easily be inferred that, in this case, the minimum compensation angle is 60°, since each lamination only carries either tabs and cavities or tabs, cavities and perforations in an eqaul number.

Anyone skilled in the art is therefore readily able to see how with a rotor stack assembled out of laminations according to the present invention the possibility is given for a compensation to be carried out by a pre-defined angle with exactly half the punchings/perforations that it would prove necessary to make in the laminations according to the prior art. It can be easily appreciated that such a circumstance makes it possible for processing to be carried out more rapidly and economically.

It will be appreciated that the above description and illustrations with reference to the accompanying drawings have only been given by way of merely exemplifying the present invention, and that a number of modifications and variants can therefore be introduced or implemented without departing from the scope thereof.

What is claimed is:

1. Rotor for electric motor, comprising a rotor stack formed by a plurality of substantially plane, contiguously stacked ferromagnetic laminations fastened together by means of a mutual engagement brought about by a plurality of cavities and protrusions or tabs provided on a surface of said laminations, said cavities and tabs being so formed, arranged and sized as to ensure that at least one of said tabs of one of said laminations engages a cavity of a contiguous lamination, wherein at least two of the laminations forming said stack have the following characteristics:

said two laminations are of first and second different types (10, 11) and substantially equal in diameter for each of said types, said two laminations are arranged in an alternate manner with respect to said two types, characterized in that said first (10) of said tvpes of laminations is provided with a plurality of first tabs (12) which are arranged on a same side of said first type lamination, said first tabs are arranged at regular intervals along a first circumference centered on an axis of said rotor stack, a plurality of perforations (14) are provided along said first circumference in said first type lamination, and are arranged corresponding to an edge of a respective first tab with a same orientation with respect to the respective first tab, so that said first tabs and corresponding to said perforations alternate along said first circumference, first cavity (13) is provided in said first type lamination corresponding to each of said first tabs, said second (11) of said types of laminations is provided with a plurality of second tabs (15) which protrude from a same side of said second type lamination, said second tabs are arranged at regular intervals along a second circumference centered on the axis of said rotor stack and having a same radius as said first circumference, a second cavity is provided in said second type lamination corresponding to each of said second tabs, said second tabs are adapted to fit into the first cavities, said first tabs are adapted to be accommodated in the second cavities of the second type lamination wherein the perforations in the first type lamination are covered by the adjacent second type lamination.

2. Rotor according to claim 1, characterized in that said second tabs (15) are provided without any material being removed from said second type lamination.

3. Rotor according to claim 2, characterized in that said first cavities, which result from the association of said first cavities (13) corresponding to said first tabs with said respective perforations (14) in said first type lamination, and said second tabs of said second type lamination are so shaped, arranged and sized as to enable said second tabs to partially slip within said respective first cavity in said first type lamination.

4. Rotor according to claim 3, characterized in that all of said laminations forming said rotor stack belong to said first or second type lamination.

5. Rotor according to any of the preceding claims, characterized in that said first tabs of said first type lamination first, with the corresponding perforations, and said second tabs of said second type lamination are arranged in a non-opposing position with respect to the axis of the rotor.

6. Rotor according to claim 5, characterized in that said first and second tabs are mutually arranged, on the corresponding first type or second type lamination, at an angle of 120°.

* * * * *